Jan. 6, 1953     E. R. BLOUT ET AL     2,624,239

INFRARED BAND PASS FILTER

Filed March 2, 1949

Elkan R. Blout
John E. Campbell
Richard S. Corley and
Patricia L. Snow

INVENTORS

BY Donald L. Brown

Attorney

Patented Jan. 6, 1953

2,624,239

UNITED STATES PATENT OFFICE 2,624,239

INFRARED BAND PASS FILTER

Elkan R. Blout and John E. Campbell, Cambridge, Richard S. Corley, Boston, and Patricia L. Snow, Cambridge, Mass., assignors to Polaroid Corporation, Cambridge, Mass., a corporation of Delaware Application March 2, 1949, Serial No. 79,244

7 Claims. (Cl. 88—109)

This invention relates to band pass filters which are substantially opaque to visible radiation and to radiation in the near-infrared of all wavelengths less than 0.9 micron, and which show relatively high transmission for wavelengths in the infrared between 1.5 and 5.5 microns.

Objects of the invention are to provide filters of the character described in sheetlike form which are self-supporting, stable, durable, readily handle, easily manufactured, cheap, and of high optical quality; to provide such filters of synthetic plastic sheets comprising partially dehydrohalogenated polyvinyl chloride, polyvinylidene chloride or copolymers thereof; to provide in connection with such filters, transparent supporting plates bonded thereto, and more specifically transparent supporting plates of glass adapted to cut off and block all radiation of wavelengths longer than 3 microns whereby a narrow band pass filter is provided for wavelengths in the infrared in the band from about 1 to 3 microns; and to provide in connection with filters of the character described, protective coatings which stabilize the filters and provide effective resistance to the action of heat and to weathering.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
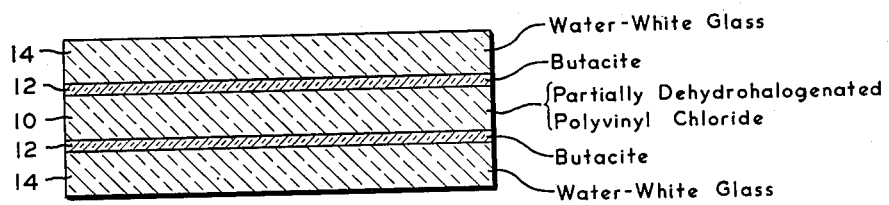
Figure 1 is a view in section of a filter embodying one modification of the invention.

The present invention is concerned with the production of relatively narrow band pass filters showing high transmission in the wavelength band between about 1 and 5.8 microns, or in the narrower wavelength band between about 1 and 3 microns and showing substantially complete opacity for radiation of wavelengths less than 1 micron and including all radiation in the visible. Such filters possess great utility in signaling devices employing infrared radiation, and in many other fields of activity where infrared radiation is employed and visible radiation excluded.

The present invention contemplates the provision of filters possessing the desired properties by the partial dehydrohalogenation of sheets or films of polyvinyl chloride or of polyvinylidene chloride or of copolymers of said materials with each other or with small amounts of such other vinyl compounds as, for example, polyvinyl acetate. Hereafter in the specification and in the claims where reference is made to sheets "comprising polyvinyl chloride" or "comprising polyvinylidene chloride," it is to be understood that such a description of the sheet material is intended to cover sheets which consist essentially of the compound or compounds specified, and sheets which comprise the specified compound or compounds mixed, or copolymerized with a small amount of some other compound or compounds which have substantially no effect on the desired optical properties of the sheet. In every case it is intended that the optical properties of the sheet shall be derived either from polyvinyl chloride or polyvinylidene chloride or both materials.

A preferred material for use in the practice of the present invention is polyvinyl chloride. This material is commercially available in sheet form copolymerized with a small percentage of polyvinyl acetate. The sheets are plasticized and may contain also small amounts of a stabilizer and an anti-blocking agent. Such sheets are entirely satisfactory for use in producing the band pass filters of the present invention. A suitable sheet material, for example, is that sold by Bakelite Corporation under the designation VB-1925 Natural which sheet comprises approximately 75% by weight of resin and 25% by weight of plasticizer with small amounts of a stabilizer and anti-blocking agent. Approximately 95% of the resin in the sheet is polyvinyl chloride and 5% is polyvinyl acetate. The plasticizer is believed to be dioctyl phthalte. Sheets of plasticized polyvinyl chloride, sheets of plasticized polyvinylidene chloride and sheets comprising the copolymers of polyvinyl chloride and polyvinylidene chloride in any proportions as for example the sheet sold as Saran M, have been found wholly satisfactory in the practice of the present invention. Moreover, sheets comprising copolymers of either polyvinyl chloride or polyvinylidene chloride and polyvinyl acetate, in varying proportions, have been found satisfactory.

Since the optical properties of the filters of the invention derive from the dehydrohalogenation of polyvinyl chloride or polyvinylidene chloride, it will be apparent that where copolymers of these materials with other vinyl compounds are employed, preferred results are obtained when the polyvinyl chloride or the polyvinylidene chloride comprises the greater percentages of the copolymer.

In the practice of the present invention the sheet or film of polyvinyl chloride or polyvinylidene chloride is imbibed in a bath comprising a swelling agent, a conversion agent and a diluent. For example, where a sheet of the polyvinyl chloride-polyvinyl acetate copolymer, heretofore described as commercially available, is employed, imbibition in the bath at room temperature for a period of approximately twenty minutes is satisfactory. The imbibition time is not critical. The sheet may be imbibed for from fifteen to thirty minutes for example, and even these limits are not critical where some departure from the high optical properties of the sheet is permitted. A preferred thickness for the sheet is approximately .005 inch, but satisfactory results have been obtained with thinner sheets.

A suitable treating bath may comprise, for example, 100 cc. of methyl ethyl ketone as the swelling agent; 18 cc. of Triton B, a 40% solution of benzyl trimethyl ammonium hydroxide in water, as the conversion agent; and 30 cc. of Solox, a mixture of ethyl alcohol and ethyl acetate, as the diluent. Such a treating bath has been found satisfactory for all forms of sheet material used in the practice of the present invention. It is to be understood, however, that other baths may be employed, if desired, including reasonable variations in the proportions of the materials specified above as well as other swelling agents, conversion agents and/or diluents. For example, tetrahydrofuran may be employed in lieu of methyl ethyl ketone.

After the sheet has been soaked for the desired period in the treating bath, it is removed from the bath and washed with water. It is then subjected to a heat treatment which causes the sheet to shrink appreciably and which substantially reduces the quantity of plasticizer and water in the sheet. The sheet, for example, may be subjected to a temperature of approximately 140° C. for a period of from six to eight hours. It is to be understood, however, that neither the temperature specified nor the time specified for the continuance of the heat treatment is critical. If a higher temperature is employed comparable results may be obtained by a shorter treatment, and if a lower temperature is employed comparable results may be obtained by a more extended treatment. A completely satisfactory range of temperatures may be anywhere from 120° to 160° C. although it should be noted that satisfactory results have been obtained by treatments at still lower temperatures. For example, polyvinylidene chloride may be converted at room temperature, using a suitable imbibition bath. Where the treatment is carried forward at the higher temperature, for example at 160° C., the sheet appears to possess somewhat less tensile strength and is more liable to breakage in handling. The sheet should preferably be held during heat treatment in such a way as to permit appreciable contraction, but it should be so held that at the end of the treatment the sheet is flat and under some tension. If the sheet is not so held it may curl under the heat treatment and m y be more readily broken when attempts are made thereafter to flatten it.

Sheets which have been subjected to the conversion bath and heat treatment previously described are sufficiently strong, pliable, and resilient to be employed as filters without other support than a suitable mount. They may be readily handled, packaged, shipped, and subjected to further treatment such, for example, as the lamination or stabilization treatments hereinafter described, without fear of breakage.

Figure 3:
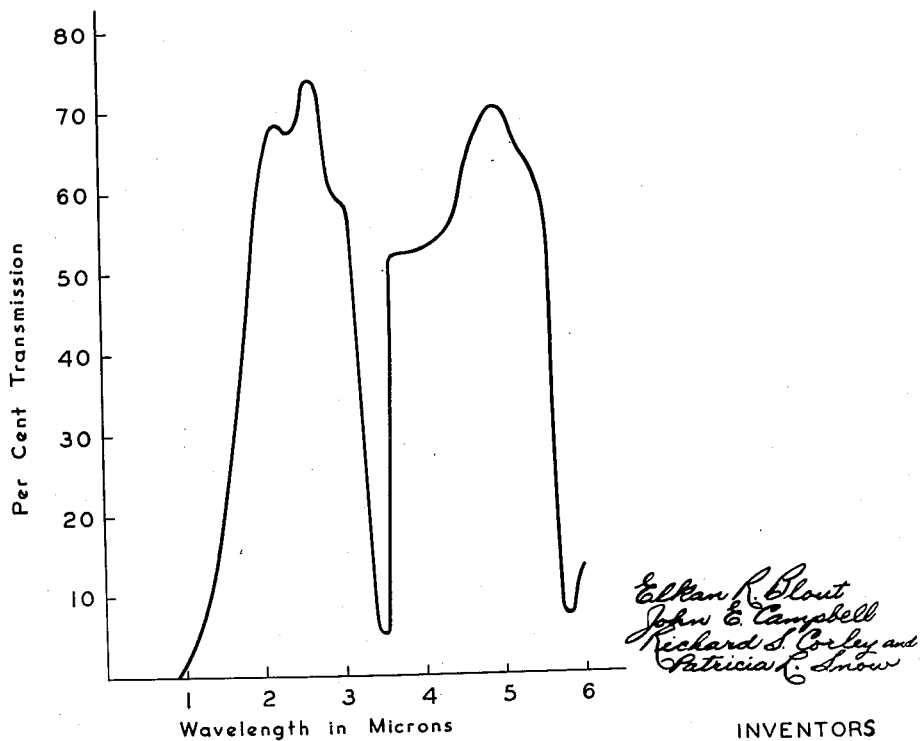
Fig. 3 is a graph wherein the per cent transmission is plotted against the wavelength in microns and which is illustrative of the transmission characteristics of a filter such as is illustrated, for example, in Fig. 2.

Fig. 3 illustrates a typical transmission curve for a sheet of polyvinyl chloride which has been subjected to the partial dehydrohalogenation described. The sheet shows substantially zero transmission for all radiation below 0.9 micron, and rapidly increasing transmission to about 67% at 2 microns, and to slightly better than 70% at about 2.5 microns. The sheet shows better than 50% transmission for the entire wavelength band between 1.7 and 5.5 microns except for a narrow band in the neighborhood of 3.3 microns, where the sheet shows the typical absorption characteristics of polymers containing substantial numbers of the CH group. The transmission curve of a typical filter of the present invention indicates the presence in the treated sheet of a substantial number of CH groups, a substantial number of $CH_2$ and $C=C$ groups, and a somewhat smaller but appreciable number of OH groups. A substantial amount of the chlorine in the sheet has been driven off by the partial dehydrohalogenation process heretofore described, and depending upon the resin employed, i. e., whether it is polyvinyl chloride, polyvinylidene chloride or a copolymer of the two materials, the loss of chlorine will be from one-fifth to one-third of the initial chlorine content. In every case, however, the finished product contains an appreciable quantity of chlorine. The plasticizer originally present in the sheet has been largely driven off by the treatment to which the sheet has been subjected, as has been the water contained in the sheet. Where the sheet before treatment comprised essentially polyvinyl chloride, the finished product of the processes described may be characterized as a sheet comprising partially dehydrohalogenated polyvinyl chloride, and where the sheet before treatment comprised essentially polyvinylidene chloride, the filter resulting from the processing described may be said to comprise essentially partially dehydrohalogenated polyvinylidene chloride.

Treated sheets not otherwise protected show a gradual increase in density in air at room temperature over the first two days succeeding the heat treatment. This increase in density results in a slight shift to longer wavelengths of the band edge near 1 micron without loss in the transmission properties at higher wavelengths. Such an alteration in the properties of the sheet may be desirable and may justify delay in the further treatment of the sheet, as hereinafter described, until after this increase in density has taken place. Thereafter, i. e., commencing with about two days after the completion of the heat treatment, the unstabilized sheet begins to show a decrease in density, i. e., a slight increase in the transmission for wavelengths in the neighborhood of one micron, and this tendency increases steadily thereafter for protracted periods, and may progress to a point where the sheet becomes unfit for certain uses after a few weeks. This alteration in the optical properties of the sheet may be prevented and the sheet may be stabilized against the action of heat and weathering by laminating the sheet between glass cover plates or by coating the sheet with a suitable stabilizing film.

Figure 2:
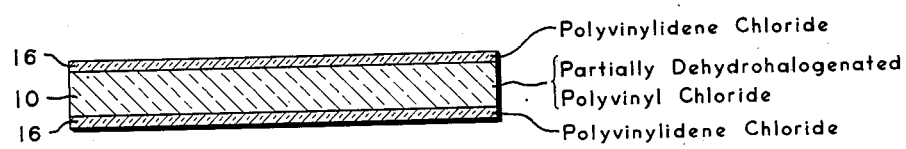
Fig. 2 is a view in section of a filter embodying another modification of the invention.

In Fig. 1 there is illustrated the product of the present invention wherein the partially dehydrohalogenated sheet of polyvinyl chloride 10 has been laminated by two adhesive layers 12 to two glass cover plates 14. These cover plates may preferably comprise iron-free, or water-white glass, and when this glass is employed the resulting filter transmits radiation only below 2.8 microns, the glass effectively cutting off substantially all radiation beyond 3 microns otherwise transmitted by the dehydrohalogenated polyvinyl chloride. The resulting laminated filter is thus particularly effective where an extremely narrow band pass between, for example, 0.9 or 1 micron and about 3 microns is desired. The lamination may be satisfactorily accomplished by employing as the adhesive plasticized polyvinyl butyral, or other suitable transparent adhesives. The lamination may be effected by the use of heat and pressure in ways well known to the art, and kerosene may be employed during the lamination to eliminate air bubbles which otherwise might form between the laminated films. The resulting lamination, the product illustrated in Fig. 1, is stable to weathering and to all temperatures below 100° C. or, in fact, to all temperatures below those at which the adhesive begins to discolor and bubble.

Where it is intended that the filter transmit radiation within the wave band of from 3.3 to 5.8 microns, the glass lamination should be avoided and under these circumstances the treated sheet may be stabilized by coating the exposed surfaces with thin films of a suitable stabilizing resin. The preferred material for this use is the polyvinylidene chloride copolymerized with a small percentage of acrylonitrile, sold commercially as Saran F 120. Other suitable coatings may comprise polyvinyl chloride, for example the material which was previously described as that from which a preferred embodiment of the invention might be made, polyethylene, the alkyd modified urea-formaldehyde resin sold as Polymerin 400, polyvinylidene chloride and other copolymers of polyvinyl chloride and polyvinylidene chloride. A suitable method for coating the treated sheet is by dipping the sheet in a weak solution, for example a 3% solution of polyvinylidene chloride in methyl ethyl ketone, or the other stabilizing plastics in suitable solvents. The stabilizing film may be built up by successive dips. For example, satisfactory results have been obtained where the sheet has been dipped three times in such a solution. The coated sheet, which is shown in Fig. 2 of the drawing, wherein 10 represents the sheet of partially dehydrohalogenated polyvinyl chloride or polyvinylidene chloride and 16 represents the coatings of polyvinylidene chloride, is completely stable to weathering at normal temperatures, is completely stable to temperatures of 100° C. for periods of 150 hours of continuous treatment at that temperature, is stable to temperatures of 120° C. for periods of 100 hours of continuous treatment, and is stable to temperatures of 140° C. for short periods. When subjected to temperatures of this character for relatively long periods the transmission properties of the sheets show some slight change in the near-infrared transmission around one micron.

Speaking generally, the product of the present invention is a band pass filter comprising partially dehydrohalogenated material from the class consisting of polyvinyl chloride and polyvinylidene chloride, which is completely opaque to visible radiation and which shows less than 1% transmission for any wavelength up to 0.9 micron or 1.0 micron. The filter may preferably show zero transmission for all wavelengths below 0.9 micron. It shows high transmission for wavelengths in the band between 1.5 microns and 5.5 microns unless used in connection with a glass or other material which is opaque to radiation beyond 3 microns. The filter may be readily stabilized to temperatures usually met with in operation, and to weathering, either by lamination between glass or by coating in the manner described, and the filter is, furthermore, sufficiently tough, durable and strong to be readily handled and to be used without mechanical supporting aids other than standard mounts.

Since certain changes may be made in the above product without departing from the scope of the invention involved, it is intended that all matter contained in the above description or shown in the accompanying drawing shall be interpreted as illustrative and not in a limiting sense.

The Government of the United States may make use of the invention shown and described without payment of royalties.

What is claimed is:

1. A band pass filter for infrared radiation comprising a sheet comprising partially dehydrohalogenated material from the class consisting of polyvinyl chloride and polyvinylidene chloride which has been imbibed in a bath comprising a swelling agent, a conversion agent and a diluent and thereafter heated until the chlorine content of said material has been reduced by from one-fifth to one-third, said sheet being substantially completely opaque to all radiation in the visible spectrum and in the near-infrared of wavelengths less than 0.9 micron, and showing relatively high transmission for the wavelength band between 1.7 and 5.5 microns with the exception of a narrow band of low transmission at about 3.3 microns.

2. A band pass filter for infrared radiation comprising a sheet comprising partially dehydrohalogenated material from the class consisting of polyvinyl chloride and polyvinylidene chloride which has been imbibed in a bath comprising a swelling agent, a conversion agent and a diluent and thereafter heated until the chlorine content of said material has been reduced by from one-fifth to one-third, said sheet being substantially completely opaque to all radiation in the visible spectrum and in the near-infrared of wavelengths less than 0.9 micron, and showing relatively high transmission for the wavelength band between 1.7 and 5.5 microns with the exception of a narrow band of low transmission at about 3.3 microns, each surface of said sheet having bonded thereto a layer of a tranparent heat- and weather-resistant organic plastic material.

3. A filter as called for in claim 2 wherein at least one of said layers comprises at least one material from the class consisting of polyvinyl chloride and polyvinylidene chloride.

4. A filter as called for in claim 2 wherein each said layer comprises polyvinylidene chloride.

5. A filter as called for in claim 1 wherein said sheet comprises partially dehydrohalogenated polyvinyl chloride.

6. A filter as called for in claim 2 wherein said sheet comprises partially dehydrohalogenated polyvinyl chloride and each said layer comprises at least one material from the class consisting of polyvinyl chloride and polyvinylidene chloride.

7. A filter as called for in claim 1 wherein said sheet comprises partially dehydrohalogenated polyvinylidene chloride.

ELKAN R. BLOUT.
JOHN E. CAMPBELL.
RICHARD S. CORLEY.
PATRICIA L. SNOW.

REFERENCES CITED

The following references are of record in the file of this patent:

UNITED STATES PATENTS

| Number | Name | Date |
|---|---|---|
| 1,627,935 | Stinchfield | May 10, 1927 |
| 2,099,976 | Hagedorn | Nov. 23, 1937 |
| 2,408,608 | Cass | Oct. 1, 1946 |
| 2,426,080 | Chapman et al. | Aug. 19, 1947 |
| 2,446,984 | Rogers et al. | Aug. 10, 1948 |
| 2,495,499 | Amon et al. | Jan. 24, 1950 |

FOREIGN PATENTS

| Number | Country | Date |
|---|---|---|
| 419,826 | Great Britain | Nov. 19, 1934 |

OTHER REFERENCES

Fierz-David et al.; article in Helvetica Chimica Acta: vol. 28, 1945, pages 455 to 464, entitled "Vinyl Chloride and its Polymerization Products: Polyvinyl Chloride," (Abstract #120 in National Paint, Varnish and Lacquer Association for Jan. 1947, pages 29 and 30; photostatic copy in Division 50, Class 260—92.8).